(12) United States Patent
Kon et al.

(10) Patent No.: US 12,109,732 B2
(45) Date of Patent: Oct. 8, 2024

(54) PELLET PRODUCTION METHOD

(71) Applicant: TOYOBO CO., LTD., Osaka (JP)

(72) Inventors: Sakito Kon, Yamaguchi (JP); Yoshitaka Ayuzawa, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 536 days.

(21) Appl. No.: 17/622,411

(22) PCT Filed: Jun. 2, 2020

(86) PCT No.: PCT/JP2020/021682
§ 371 (c)(1),
(2) Date: Dec. 23, 2021

(87) PCT Pub. No.: WO2020/261890
PCT Pub. Date: Dec. 30, 2020

(65) Prior Publication Data
US 2022/0371225 A1 Nov. 24, 2022

(30) Foreign Application Priority Data
Jun. 27, 2019 (JP) .................. 2019-119501

(51) Int. Cl.
*B29B 9/06* (2006.01)
*B29B 9/14* (2006.01)
*B29B 13/04* (2006.01)

(52) U.S. Cl.
CPC ............ *B29B 9/065* (2013.01); *B29B 9/14* (2013.01); *B29B 13/045* (2013.01)

(58) Field of Classification Search
None
See application file for complete search history.

(56) References Cited

U.S. PATENT DOCUMENTS 5,607,700 A * 3/1997 Kando .............. B29B 9/06
264/37.32

FOREIGN PATENT DOCUMENTS

JP   2004137450 A * 5/2004 ......... B29C 47/0011
JP   6081687        2/2017
(Continued)

OTHER PUBLICATIONS

Machine English translation of JP2012056145A, Accessed Aug. 1, 2024 (Year: 2012).*

(Continued)

*Primary Examiner* — S. Behrooz Ghorishi
*Assistant Examiner* — Adrianna N Konves
(74) *Attorney, Agent, or Firm* — Wenderoth, Lind & Ponack, L.L.P.

(57) ABSTRACT

A pellet production method comprising: an operation in which a strand comprising a glass-fiber-reinforced polyamide resin composition containing 50 mass % to 80 mass % of glass fiber is extruded from an orifice at a die; an operation in which the strand is drawn into water within a tank and is cooled; and an operation in which the cooled strand is cut to obtain a pellet; wherein an angle of incidence at which the strand enters the water within the tank is not less than 70° but is less than 90°; and wherein a ratio of a diameter of the pellet to a diameter of the orifice (diameter of the pellet/diameter of the orifice) is 0.65 to 0.97.

17 Claims, 1 Drawing Sheet

(56) References Cited

FOREIGN PATENT DOCUMENTS

WO     2020/261888     12/2020
WO     2020/261889     12/2020

OTHER PUBLICATIONS

Machine English translation of JP2004137450A, Accessed Aug. 1, 2024 (Year: 2004).*
Extended European Search Report issued Jul. 18, 2022 in corresponding European Patent Application No. 20830771.0.
Office Action issued Apr. 26, 2023 in corresponding Chinese Patent Application No. 202080035100.1, with English translation.
Translation of International Preliminary Report on Patentability and Written Opinion issued Dec. 28, 2021, in corresponding International (PCT) Patent Application No. PCT/JP2020/021682.
International Search Report issued Aug. 11, 2020 in International (PCT) Application No. PCT/JP2020/021682.
Notice of Reasons for Refusal dated Oct. 31, 2019 in Japanese Application No. 2019-119501, with English translation.

* cited by examiner

PELLET PRODUCTION METHOD

TECHNICAL FIELD

The present invention relates to a method of producing pellets comprising a glass-fiber-reinforced polyamide resin composition.

BACKGROUND ART

When reinforced with glass fiber, polyamide resin is capable of achieving not only high rigidity and high toughness but also high deflection under load. For this reason, glass-fiber-reinforced polyamide resin compositions have been widely employed as interior materials and exterior materials in the electric and electronic equipment field and in the automotive field, for example. In particular, because of the trend toward decreased product wall thickness, a polyamide resin composition which contains glass fiber in an amount that is 50 mass % or higher and which has excellent rigidity and impact resistance has been used in electric and electronic members (see, for example, Patent Reference No. 1).

Pellets comprising a glass-fiber-reinforced polyamide resin composition might, for example, be produced by a method in which an extruder is used to cause strands comprising a glass-fiber-reinforced polyamide resin composition which is in a molten state to be extruded from a die, water-cooling being carried out by causing the strands to be drawn into a tank filled with water, following which the water-cooled strands are cooled in air, and the air-cooled strands are cut.

PRIOR ART REFERENCES

Patent References

Patent Reference No. 1: Japanese Patent No. 6081687

SUMMARY OF THE INVENTION

Problem to be Solved by Invention

With such a production method, it is sometimes the case that the strands break between the die orifices and the water surface (the water surface formed by the water with which the tank is filled); more specifically, at a location in the vicinity of the die orifices. Such breaking of strands tends to occur especially when glass fiber content is high; e.g., when glass fiber content is 50 mass % or higher. When breaking of strands occurs, time and effort are required to join the broken strands together, and some of the glass-fiber-reinforced polyamide resin composition is lost.

A problem addressed by the present invention, in the context of production of pellets comprising a glass-fiber-reinforced polyamide resin composition in which glass fiber content is high—and more specifically in which glass fiber content is not less than 50 mass %—is to reduce the frequency of occurrence of strand breakage.

Means for Solving Problem

To solve these problems, the present invention is equipped with the constitution at item 1, below.

Item 1

A pellet production method comprising:
an operation in which a strand comprising a glass-fiber-reinforced polyamide resin composition containing 50 mass % to 80 mass % of glass fiber is extruded from an orifice at a die;
an operation in which the strand is drawn into water within a tank and is cooled; and
an operation in which the cooled strand is cut to obtain a pellet;
wherein an angle of incidence at which the strand enters the water within the tank is not less than 70° but is less than 90°; and
wherein a ratio of a diameter of the pellet to a diameter of the orifice (diameter of the pellet/diameter of the orifice) is 0.65 to 0.97.

Here, the angle of incidence with respect to the water is the magnitude, when the strand is viewed from the side, of the acute angle that the strand makes with the water surface which is formed by the water within the tank.

In accordance with item 1, because the fact that the strand is drawn into the water within the tank, which is to say that the strand is made to experience tension, makes it possible for glass fiber(s) and polymer(s) within the strand to be oriented in the direction of travel of the strand, i.e., the length direction of the strand, it is possible to increase the tensile strength thereof. It will therefore be possible to form a strand that will have higher strength (i.e., it will be less likely to break) with respect to stresses in the tension direction than it will have with respect to shear stresses (more specifically, stresses such as would tend to cause mutual displacement of portions at either side of a cross-section taken along the radial direction of the strand).

Moreover, by causing the strand to enter the water with which the tank is filled in such fashion that the angle of incidence with respect thereto is not less than 70° but is less than 90°, i.e., by causing the strand to be incident thereon in a state that is close to being perpendicular with respect to the water surface, because under the force of its own weight there will be a greater tendency for stresses in the tension direction to be produced than for shear stresses (more specifically, stresses such as would tend to cause mutual displacement of portions at either side of a cross-section taken along the radial direction of the strand) to be produced, it will be possible to reduce the shear stresses which would be more likely to lead to breakage. It will therefore be possible to suppress breakage of strands that might otherwise occur under the force of their own weight.

What is more, because it will be possible by causing the ratio (pellet diameter/orifice diameter) to be not less than 0.65 to prevent excessive tension from acting on the molten portion of the strand, this will make it possible to suppress occurrence of strand breakage.

In addition, by causing the ratio (pellet diameter/orifice diameter) to be not greater than 0.97, it will be possible to cause such tension as will suppress occurrence of runout at the molten portion of the strand to act on the molten portion of the strand. Accordingly, it will be possible to reduce shear stresses (more specifically, stresses such as would tend to cause mutual displacement of the portion at the strand that has not yet exited the orifice and the portion of the strand that has already exited the orifice) produced at the molten portion of the strand due to runout of the strand.

It is preferred that the invention be further equipped with the constitutions at item 2, below, and therebelow.

Item 2

The pellet production method according to item 1 wherein
at least one first guide roller for guiding the strand within the tank is provided within the tank; and
an angle made by portions of the strand that are ahead of and behind that first guide roller which is in an upstreammost location is not less than 90°.

Whereas flexibility decreases as solidification of the strand progresses underwater, if the strand is suddenly made to experience curvature at the first guide roller which is in the upstreammost location, it may be the case that excessive curvature will remain at the strand.

In accordance with item 2, by causing the angle made by the portions of the strand that are ahead of and behind the first guide roller which is in the upstreammost location to be not less than 90°, because it will be possible to ensure that the curvature of the strand is gentle, it will be possible to prevent occurrence of a situation in which excessive curvature remains thereat. It will therefore be possible to reduce the runout of the strand, and it will be possible to reduce shear stresses (more specifically, stresses such as would tend to cause mutual displacement of the portion at the strand that has not yet exited the orifice and the portion of the strand that has already exited the orifice) produced at the molten portion of the strand due to the runout of the strand. More specifically, of the angles made by the portions of the strand that are ahead of and behind the first guide roller which is in the upstreammost location, note that this angle is the magnitude of the angle which opens toward the water surface as viewed from the side of the strand.

Item 3

The pellet production method according to item 2 wherein the angle made by the portions of the strand that are ahead of and behind that first guide roller which is in the upstreammost location is not greater than 179°.

Because it will be possible by causing this angle to be not greater than 179° to cause the strand and the upstreammost first guide roller to come into reliable mutual contact, it will be possible to reduce the tendency for runout and chaotic motion of the strand occurring at locations downstream from the upstreammost first guide roller to propagate to locations upstream from the upstreammost first guide roller. It will therefore be possible to even more effectively suppress occurrence of strand breakage. And because it will be possible to cause the strand and the upstreammost first guide roller to come into reliable mutual contact, it will also be possible to cause stresses occurring at the strand to be diffused as a result of coming in contact with the upstreammost first guide roller.

Item 4

The pellet production method according to any of items 1 through 3 wherein the operation in which the strand is cooled comprises an operation in which the strand that was water-cooled within the tank is air-cooled.

This will make it possible to cause at least a portion of the moisture adhering to the strand to be vaporized by the heat possessed by the strand.

Item 5

The pellet production method according to item 4 wherein
at least one second guide roller for causing the strand that was water-cooled within the tank to be guided through air is provided; and
an angle made by portions of the strand that are ahead of and behind that second guide roller which is in an upstreammost location is not less than 140°.

By causing this angle to be not less than 140°, because it will be possible to ensure that curvature of the strand is gentle, it will be possible to suppress occurrence of runout at the strand. More specifically, of the angles made by the portions of the strand that are ahead of and behind the second guide roller which is in the upstreammost location, note that this angle is the magnitude of the angle which opens toward the ground as viewed from the side of the strand.

Item 6

The pellet production method according to item 1 wherein
the operation in which the strand is cooled comprises an operation in which the strand that was water-cooled within the tank is air-cooled;
at least one first guide roller for guiding the strand within the tank is provided within the tank;
at least one second guide roller for causing the strand that was water-cooled within the tank to be guided through air is provided; and
an angle made by portions of the strand that are ahead of and behind that second guide roller which is in an upstreammost location is greater than an angle made by portions of the strand that are ahead of and behind that first guide roller which is in an upstreammost location.

Item 6 will make it possible to reduce occurrence of runout at the strand, and will make it possible to suppress occurrence of strand breakage. Description will be given with respect to this. When the strand experiences curvature at the upstreammost second guide roller, because solidification of the strand will have progressed further than was the case when it experienced curvature at the upstreammost first guide roller, it will have little flexibility. Because the strand has little flexibility, if the curvature at the upstreammost second guide roller is excessively tight, it may be the case that the strand will be unable to conform to that curvature. If the strand is unable to conform to that curvature, the strand will exhibit runout. To address this, in accordance with item 6, because the angle made by the portions of the strand that are ahead of and behind that second guide roller which is in the upstreammost location is greater than the angle made by the portions of the strand that are ahead of and behind that first guide roller which is in the upstreammost location, as compared with the opposite situation, the strand will be more easily able to conform to the curvature at the upstreammost second guide roller. Accordingly, it will be possible to reduce occurrence of runout at the strand, and it will be possible to suppress occurrence of strand breakage.

At item 6, note that the angle made by the portions of the strand that are ahead of and behind the second guide roller which is in the upstreammost location—more specifically, of the angles made by the portions of the strand that are ahead of and behind the second guide roller which is in the upstreammost location as viewed from the side of the strand—the magnitude of the angle which opens toward the ground is that angle. The angle made by the portions of the strand that are ahead of and behind the first guide roller which is in the upstreammost location—more specifically, of the angles made by the portions of the strand that are ahead of and behind the first guide roller which is in the upstreammost location as viewed from the side of the strand—the magnitude of the angle which opens toward the water surface is that angle.

Item 7

The pellet production method according to any of items 1 through 6 wherein a standard deviation of an aspect ratio of the pellet is not greater than 0.20.

Because the standard deviation is not greater than 0.20, it is fair to say that effective suppression of runout at the strand is made possible thereby.

Item 8

The pellet production method according to any of items 1 through 7 wherein the polyamide resin is present within 100 mass % of the glass-fiber-reinforced polyamide resin composition in an amount that is not less than 20 mass %.

Because polyamide resin is present therewithin in an amount that is not less than 20 mass %, it will be possible to obtain pellets having superior moldability.

Item 9

The pellet production method according to any of items 1 through 8 wherein average glass surface area per unit fiber as calculated based on residual glass fiber length at the pellet is not less than 1.1 times critical glass surface area.

Because average glass surface area/critical glass surface area is not less than 1.1, it will be possible to produce products having superior mechanical properties, e.g., rigidity and impact resistance, from the pellets.

Item 10

The pellet production method any of items 1 through 9 wherein the polyamide resin comprises an aliphatic polyamide and a polyamide having an aromatic component.

Because the polyamide resin comprises these, it will be possible to produce products having superior flexural modulus of elasticity and impact resistance from the pellets.

Item 11

The pellet production method according to item 10 wherein the polyamide having the aromatic component comprises poly-meta-xylene adipamide for which concentration of terminal carboxy groups is not greater than 50 meq/kg and for which relative viscosity in 96% sulfuric acid solution is 1.4 to 1.8.

The poly-meta-xylene adipamide will make it possible to improve the flow characteristics of the glass-fiber-reinforced polyamide resin composition during molding.

Item 12

The pellet production method according to item 10 or 11 wherein the aliphatic polyamide comprises polycaproamide for which concentration of terminal carboxy groups is 55 meq/kg to 95 meq/kg and for which relative viscosity in 96% sulfuric acid solution is 1.4 to 2.0.

The polycaproamide will make it possible to improve the flow characteristics of the glass-fiber-reinforced polyamide resin composition during molding and the manufacturability thereof when a large amount of glass fiber is used as filler while maintaining a certain degree of toughness.

Item 13

The pellet production method according to any of items 1 through 12 wherein the glass fiber comprises at least either glass fiber of circular cross-section of diameter not greater than 7 μm or glass fiber of flattened cross-section.

This will permit facilitation of production of pellets for which average glass surface area/critical glass surface area is not less than 1.1.

Item 14

The pellet production method according to any of items 1 through 13 wherein an extruder is used to extrude the strand.

Because an extruder is used, it will be possible to extrude specific quantities of strand.

Item 15

The pellet production method according to any of items 1 through 14 wherein, at the operation in which the strand is extruded, the strand is extruded in air.

Because the strand is extruded in air, it will be possible to cause the strand to dissipate heat in the air.

Item 16

The pellet production method according to any of items 1 through 15 wherein there is only one of the at least one first guide roller provided within the tank.

This will make it possible to limit the number of times that the strand experiences curvature underwater.

Item 17

The pellet production method according to item 16 wherein the angle made by the portions of the strand that are ahead of and behind that first guide roller which is in the upstreammost location is not greater than 120°.

Because it will be possible by causing this angle to be not greater than 120° to cause the strand and the upstreammost guide roller to come into reliable mutual contact, it will be possible to reduce the tendency for runout and chaotic motion of the strand occurring at locations downstream from the upstreammost guide roller to propagate to locations upstream from the upstreammost guide roller. It will therefore be possible to even more effectively suppress occurrence of strand breakage. And because it will be possible to cause the strand and the upstreammost guide roller to come into reliable mutual contact, it will also be possible to cause stresses occurring at the strand to be diffused as a result of coming in contact with the upstreammost guide roller.

Benefit of the Invention

In the context of production of pellets comprising a glass-fiber-reinforced polyamide resin composition in which glass fiber content is high—and more specifically in which glass fiber content is not less than 50 mass %—the present invention makes it possible to reduce the frequency of occurrence of strand breakage.

EMBODIMENTS FOR CARRYING OUT THE INVENTION

Below, description is given with respect to embodiments of the present invention.

1. Equipment Used for Pellet Production

Figure 1:
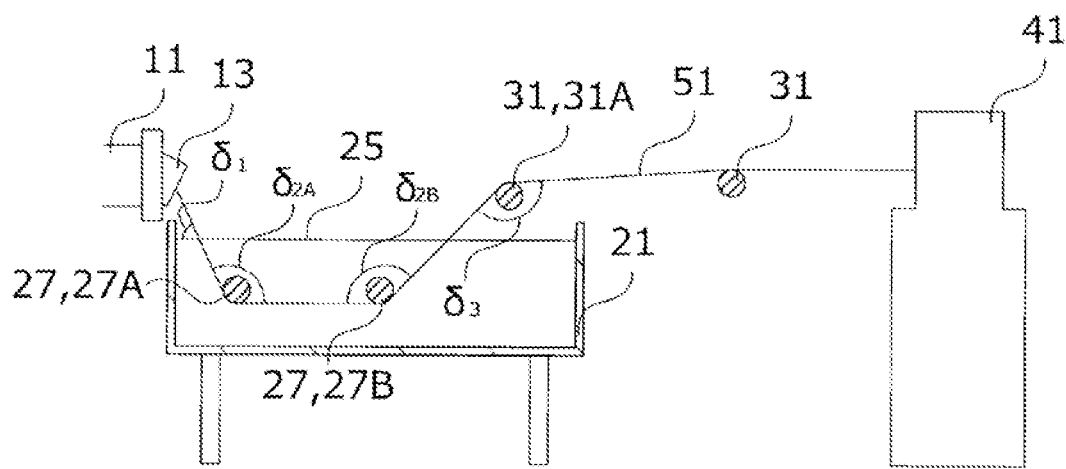
FIG. 1 Schematic diagram showing the constitution of equipment in accordance with the present embodiment.

As shown in FIG. 1, in accordance with the present embodiment, extruder 11, tank 21, pelletizer 41, and so forth are used to produce pellets comprising a glass-fiber-reinforced polyamide resin composition. Description will be given with respect to this equipment.

Extruder 11 comprises a screw (not shown), and a cylinder (not shown) which surrounds the screw. In other words, extruder 11 comprises a cylinder, and a screw which is disposed within the cylinder. Extruder 11 is such that the rotating screw is capable of causing glass-fiber-reinforced polyamide resin composition raw material to be kneaded as it is conveyed, and of causing a specific quantity of the glass-fiber-reinforced polyamide resin composition to be extruded therefrom. As extruder 11, single-screw extruders and twin-screw extruders may be cited as examples. Of these, twin-screw extruders are preferred.

Die 13 is attached to extruder 11. Die 13 may be attached to the cylinder by way of an adapter. To permit flow of glass-fiber-reinforced polyamide resin composition which is conveyed thereto from the outlet of extruder 11, die 13 has a flow path (hereinafter "nozzle"). The nozzle outlet, i.e., orifice, is circular in shape. Note, however, that the shape of the orifice is not limited to the foregoing. For example, it may be elliptical in shape. A plurality of orifices (not shown) are provided in such fashion as to be arrayed in the width direction of die 13. With regard to the number of orifices that are present, there might be 1 to 50 thereof, or there might be 5 to 30 thereof, for example.

Tank 21 is arranged so as to be capable of receiving strand(s) 51 which exit die 13. In other words, tank 21 is arranged at a location which is downstream from extruder 11. A strand-cooling bath may be favorably used as tank 21. Tank 21 contains water. The water surface 25 formed by that water is at a location which is lower than the orifices of die 13.

Provided within tank 21 is at least one guide roller 27 for guiding strand(s) 51. With regard to the number of guide rollers 27 that are present, there might be 1 to 10 thereof, or there might be 2 to 7 thereof, for example. Here, the upstreammost guide roller 27 will be referred to as guide roller 27A, and a guide roller 27 which is downstream from guide roller 27A will be referred to as guide roller 27B. Respective guide rollers 27 are arranged so as to come in contact with the upper portion of strand 51, and more specifically, with that portion thereof which is toward water surface 25 in the radial direction of strand 51. The shafts of the respective guide rollers 27 extend in a direction which is horizontal and which is in the transverse direction (hereinafter "TD"). Note that FIG. 1 shows a situation in which a plurality of, and more specifically two, guide rollers 27 are provided.

Downstream from tank 21 as well, at least one guide roller 31 for guiding strand(s) 51 is provided. With regard to the number of guide rollers 31 that are present, there might be 1 to 10 thereof; or there might be 2 to 7 thereof, for example.

Here, the upstreammost guide roller 31 will be referred to as guide roller 31A. Respective guide rollers 31 are arranged so as to come in contact with the lower portion of strand 51, and more specifically, with that portion thereof which is toward the ground in the radial direction of strand 51. The shafts of the respective guide rollers 31 extend in a direction which is horizontal and which is in the TD. Note that FIG. 1 shows a situation in which a plurality of, and more specifically two, guide rollers 31 are provided.

Pelletizer 41 is arranged at a location downstream from guide roller(s) 31. Pelletizer 41 comprises a takeup roll (not shown) for takeup of strand 51, and a cutter (not shown) for cutting strand 51 after it has been taken up. Pelletizer 41 may cause pellets to be formed by causing the cutter to cut the strand 51 as the strand 51 is taken up by the roll.

At a pellet production method in accordance with the present embodiment, strand 51 is extruded in air from die 13 of extruder 11, enters the water within tank 21, is made to advance while underwater in parallel fashion with respect to guide roller(s) 27, emerges therefrom so as to be above the water, is made to advance while in the air in parallel fashion with respect to guide roller(s) 31, and is cut at pelletizer 41.

2. Pellet Production Method

A pellet production method in accordance with the present embodiment includes an operation (hereinafter "extruding operation") in which a strand 51 comprising a glass-fiber-reinforced polyamide resin composition is extruded from a die 13, an operation (hereinafter "cooling operation") in which the strand 51 is cooled, and an operation (hereinafter "pelletizing operation") in which the cooled strand 51 is cut to obtain pellets. The operation in which the strand 51 is cooled (cooling operation) includes an operation (hereinafter "water-cooling operation") in which the strand 51 is pulled into and cooled in water within a tank 21, and an operation (hereinafter "air-cooling operation") in which the water-cooled strand 51 is cooled in air.

2.1. Operation in which Strand Comprising Glass-Fiber-Reinforced Polyamide Resin Composition Is Extruded (Extruding Operation)

At the extruding operation, glass-fiber-reinforced polyamide resin composition raw materials, e.g., polyamide resin (A) and glass fiber (B) and/or the like is kneaded, and strand(s) 51 comprising glass-fiber-reinforced polyamide resin composition are extruded in air from orifice(s) at die 13.

As glass-fiber-reinforced polyamide resin composition raw materials, polyamide resin(s) (A), glass fiber(s) (B), copper compound(s) (C), coupling agent(s), and so forth may be cited as examples. These will be described in further detail below. By kneading the raw materials, it is possible to fabricate glass-fiber-reinforced polyamide resin composition.

The raw materials for the glass-fiber-reinforced polyamide resin composition are kneaded at extruder 11. Where a twin-screw extruder is used to carry out kneading, it is preferred that the ratio (hereinafter "screw L/D") of screw length L (mm) to screw diameter D (mm) be 10 to 100. When this is not greater than 100, it will be possible to suppress reduction in the mechanical strength of the glass-fiber-reinforced polyamide resin composition that might otherwise occur as a result of thermal degradation.

It is preferred that the cylinder temperature of extruder 11 be set so as to be not less than 5° C. higher than the melting point of polyamide resin (A), more preferred that this be set to so as to be not less than 10° C. higher than same, still more preferred that this be set to so as to be not less than 15° C. higher than same, and still more preferred that this be set to so as to be not less than 30° C. higher than same. The reason is that this will make it possible to cause effective melting of polyamide resin (A). It is preferred that the cylinder temperature be set so as to be not greater than 80° C. higher than the melting point of polyamide resin (A). The reason is that an excessively high cylinder temperature would cause marked thermal degradation of polyamide resin (A). Where polyamide resin (A) comprises a plurality of species, what is referred to herein as the "melting point of polyamide resin (A)" is the highest melting point thereamong.

It is preferred that the rotational speed of the screw at extruder 11 be not less than 100 rpm, and more preferred that this be not less than 150 rpm. When screw rotational speed is not less than 100 rpm, it will be possible to satisfactorily disperse glass fiber (B) and so forth. It is preferred that screw rotational speed be not greater than 1,500 rpm, and more preferred that this be not greater than 1,000 rpm. When this is not greater than 1,500 rpm, because this will make it possible to suppress aggregation of glass fiber (B), it will be possible to satisfactorily disperse glass fiber (B).

It is preferred that the amount (hereinafter "extruded amount") of strand(s) 51 extruded from the orifice(s) of die 13 be not less than 5 kg/hr, more preferred that this be not less than 10 kg/hr, still more preferred that this be not less than 100 kg/hr, and still more preferred that this be not less than 150 kg/hr. When this is not less than 5 kg/hr, the pellet production volume per unit time will be superior. It is preferred that the extruded amount be not greater than 2000 kg/hr, more preferred that this be not greater than 1000 kg/hr, still more preferred that this be not greater than 500 kg/hr, still more preferred that this be not greater than 400 kg/hr, and still more preferred that this be not greater than 300 kg/hr.

It is preferred that the ratio of extruded amount to screw rotational speed (i.e., extruded amount/screw rotational speed) be not less than 0.01, more preferred that this be not less than 0.1, still more preferred that this be not less than 0.4, and still more preferred that this be not less than 0.6. When this is not less than 0.01, because the rotational speed of the screw will not be excessively high relative to the extruded amount, it will be possible to suppress thermal degradation of polyamide resin (A). In calculating this ratio, note that values expressed in kg/hr are to be used for the extruded amount, and values expressed in rpm are to be used for the screw rotational speed. It is preferred that the ratio of the extruded amount to the screw rotational speed be not greater than 1.0. When this is not greater than 1.0, the speed with which the glass-fiber-reinforced polyamide resin composition and the raw materials for same are conveyed will not be too slow, and it will be possible to prevent raw materials such as glass fiber (B) from being sprayed from extruder 11 due to insufficient speed. Note that the smaller this ratio the greater will be the tendency that glass fiber (B) will be able to be dispersed uniformly.

At least in the vicinity of the orifices, the nozzles of die 13 extend in such fashion as to be inclined with respect to the horizontal direction such that they are brought nearer to the water surface 25. That is, the direction in which material is expelled from the nozzle is inclined with respect to the horizontal direction so as to be brought nearer to the water surface 25. It is preferred that in the vicinity of the orifices the inclination of the nozzles, i.e., the inclination of the direction in which material is expelled therefrom, be not less than 5° with respect to the horizontal direction, and it is more preferred that this be not less than 10° with respect thereto. It is preferred that the inclination of the nozzle be not greater than 90° with respect to the horizontal direction, and it is more preferred that this be not greater than 85° with respect thereto. Note that the nozzle need not be inclined with respect to the horizontal direction from one end to the other in the machine direction (hereinafter "MD").

It is preferred that the diameter $D_n$ of the orifices at die 13 be not less than 2.0 mm, and more preferred that this be not less than 2.5 mm. When this is not less than 2.0 mm, because it will be possible to ensure that there will be adequate strength at the molten portion of strand 51, it will be possible to suppress occurrence of strand breakage due to insufficient strength. It is preferred that diameter 131, be not greater than 10 mm, and more preferred that this be not greater than 7 mm. When this is not greater than 10 mm, because it will be possible to cause effective cooling of the interior of strand 51, it will be possible to effectively promote solidification of the interior thereof at the water-cooling operation. Accordingly, because it will be possible to prevent the cross-sectional shape of strand 51 from becoming excessively deformed due to pressure exerted on strand 51 by guide roller 27, it will be possible to suppress production of excessively flattened pellets. When the orifice is elliptical in shape, note that diameter $D_n$ indicates the maximum diameter of the orifice.

The extruding operation might, for example, proceed in accordance with procedures such as the following. That is, this might proceed in accordance with procedures such that a blender is used to mix polyamide resin (A), copper compound (C), and so forth, this is fed into extruder 11 by way of a hopper provided at a first supply port at extruder 11, and a feeder is used to cause glass fiber (B) to be fed into extruder 11 from a second supply port (hereinafter "side port") which is provided at a location that is downstream from the first supply port. Other reinforcing agent(s) may be fed into extruder 11 along with glass fiber (B). Where such procedures are employed, it is preferred that glass fiber (B) be fed into extruder 11 in such fashion as to cause glass fiber (B) to be added to a molten mixture in which at least a portion of polyamide resin (A) is present in a molten state. At the extruding operation, to remove volatile components and/or decomposed low molecular weight components, and/or to further increase the reactivity of reinforcing material(s) and/or the like with respect to polyamide resin, note that it is preferred that a vacuum pump be used to apply suction between the side port and the die head.

The strand 51 which is extruded from die 13 breaks easily. The reason for this is that the strand 51 which is extruded therefrom comprises a glass-fiber-reinforced polyamide resin composition which is in a molten state; more specifically, in a molten state and at a temperature as high as 240° C. to 400° C.

Strand 51 has higher strength with respect to stresses in the tension direction than it has with respect to shear stresses (more specifically, stresses such as would tend to cause mutual displacement of portions at either side of a cross-section taken along the radial direction of strand 51). The reason for this is that because the fact that strand 51 is taken up by the takeup roll causes elongation of strand 51, glass fibers and polymers within strand 51 are oriented in the direction of travel of strand 51; i.e., the length direction of strand 51

2.2. Operation in which Strand is Cooled (Cooling Operation)

At the cooling operation, the strand 51 which is extruded from die 13 is cooled as it is taken up and directed toward pelletizer 41. The reason for this is that it would be difficult at pelletizer 41 to cut strand 51 were it still in the molten state in which it exists after being extruded from die 13. At the cooling operation, strand 51 is drawn into the water within tank 21 and is cooled in water, and the water-cooled strand 51 is cooled in air.

2.2.1. Operation in which Strand is Drawn into Water within Tank and is Cooled in Water (Water-Cooling Operation)

At the water-cooling operation, the strand 51 which is extruded from die 13 is drawn into water within tank 21. It is preferred that the water within tank 21 be not less than 20° C., more preferred that this be not less than 25° C., and still more preferred that this be not less than 30° C. It is preferred that the water within tank 21 be not greater than 80° C., more preferred that this be not greater than 60° C., and still more preferred that this be not greater than 50° C. As the water which tank 21 may be made to contain, tap water, well water, rainwater, pure water, and so forth may be used. Reagent(s) and/or the like may be added to the water within tank 21.

At the water-cooling operation, strand 51 enters the water within tank 21 in such fashion that the angle $\delta_1$ of incidence with respect to the water is not less than 70° but is less than 90°. By causing strand 51 to enter the water within tank 21 in such fashion that the angle $\delta_1$ of incidence with respect to the water is not less than 70° but is less than 90°, i.e., by causing strand 51 to be incident thereon in a state that is close to being perpendicular with respect to the water surface 25, because under the force of its own weight there will be a greater tendency for stresses in the tension direction to be produced than for shear stresses (more specifically, stresses such as would tend to cause mutual displacement of portions at either side of a cross-section taken along the radial direction of strand 51) to be produced, it will be possible to reduce the shear stresses which would be more likely to lead to breakage. It will therefore be possible to suppress breakage of strands that might otherwise occur under the force of their own weight. Because this (causing strand 51 to enter the water in such fashion that the angle $\delta_1$ of incidence with respect to the water is not less than 70° but is less than 90°) will also permit reduction in shear stresses (more specifically, stresses such as would tend to cause mutual displacement of portions at either side of a cross-section taken along the radial direction of strand 51) produced as a result of entry into the water, this will also make it possible to suppress breakage of strands caused by such shear stresses. It is preferred that the angle $\delta_1$ of incidence with respect to the water be not less than 72°, more preferred that this be not less than 75°, and still more preferred that this be not less than 80°. Note that the angle $\delta_1$ of incidence with respect to the water is the magnitude of the acute angle that strand 51 makes with water surface 25 as viewed from the side of strand 51. That is, the angle $\delta_1$ of incidence with respect to the water is the magnitude of the acute angle that strand 51 makes with water surface 25 when strand 51 is viewed along the direction of the shaft of guide roller 27. Because causing the angle $\delta_1$ of incidence with respect to the water to be less than 90° makes it possible to prevent strand 51 from coming into contact with die 13 in accompaniment to runout of strand 51, this will make it possible to suppress breakage of strands caused by such contact. It is preferred that the angle $\delta_1$ of incidence with respect to the water be not greater than 89°, more preferred that this be not greater than 88°, and still more preferred that this be not greater than 87°.

With regard to the strand 51 after it has entered the water, whereas this is made to experience curvature at guide roller 27A, if the curvature is too sudden, it may be the case that excessive curvature will remain at strand 51. The reason for this is that because strand 51 comprises a glass-fiber-reinforced polyamide resin composition, flexibility decreases as solidification of strand 51 progresses as a result of its being cooled in water. Curvature remaining in strand 51 will cause increase in runout, i.e., chaotic motion, at strand 51. Runout of strand 51 causes occurrence of strand breakage. The reason for this is that runout of strand 51 causes stresses (shear stresses) such as would tend to cause mutual displacement of the portion at strand 51 that has not yet exited the orifice and the portion of strand 51 that has already exited the orifice to act on strand 51. Moreover, this is also due to the fact that because runout of strand 51 produces wavering in the orientation of glass fibers, it is possible that this will cause there to be weakness with respect to stresses in the tension direction.

To suppress occurrence of a situation in which excessive curvature remains at strand 51, it is preferred that the angle $\delta_{2A}$ made by the portions of strand 51 that are ahead of and behind guide roller 27A be not less than 90°. When this is not less than 90°, because it will be possible to ensure that curvature of strand 51 is gentle, it will be possible to prevent occurrence of a situation in which excessive curvature remains thereat. It will therefore be possible to reduce occurrence of runout at strand 51. It is preferred that the angle $\delta_{2A}$ be less than 180°. To cause strand 51 and guide roller 27A to come into reliable mutual contact, it is more preferred that the angle $\delta_{2A}$ be not greater than 179°, and still more preferred that this be not greater than 178°. Because it is possible by causing this to be not greater than 179° to cause strand 51 and guide roller 27A to come into reliable mutual contact, it will be possible to reduce the tendency for runout and chaotic motion of strand 51 occurring at locations downstream from guide roller 27A to propagate to locations upstream from guide roller 27A. It will therefore be possible to even more effectively suppress occurrence of strand breakage. And because it is possible to cause strand 51 and guide roller 27A to come into reliable mutual contact, it will also be possible to cause stresses occurring at strand 51 to be diffused as a result of coming in contact with guide roller 27A. More specifically, of the angles made by the portions of strand 51 that are ahead of and behind guide roller 27A, angle $\delta_{2A}$ is the magnitude of the angle which opens toward water surface 25 as viewed from the side of strand 51.

It is preferred that the angle $\delta_{2B}$ made by the portions of strand 51 that are ahead of and behind guide roller 27B be not less than 90°. It is preferred that angle $\delta_{2B}$ be less than 180°, more preferred that this be not greater than 179°, and still more preferred that this be not greater than 178°. By causing this to be not greater than 179°, it will be possible to cause strand 51 and guide roller 27B to come into reliable mutual contact. More specifically, of the angles made by the portions of strand 51 that are ahead of and behind guide roller 27B, angle $\delta_{2B}$ is the magnitude of the angle which opens toward water surface 25 as viewed from the side of strand 51.

It is preferred that the diameter of guide roller 27A be not less than 1 cm, and more preferred that this be not less than 2 cm. Because there is a tendency for the contact area between guide roller 27A and strand 51 to increase with increasing diameter of guide roller 27A, this will make it possible to reduce runout at the upstream portion of strand 51 (more specifically, the portion thereof from the orifice of die 13 to where it comes in contact with guide roller 27A). The diameter of guide roller 27A might be not greater than 20 cm, or it might be not greater than 15 cm, for example.

It is preferred that the diameters of respective guide rollers 27 be not less than 1 cm, and more preferred that these be not less than 2 cm. Because there is a tendency for the contact areas between the respective guide rollers 27 and strand 51 to increase with increasing diameters of respective guide rollers 27, this will make it possible to reduce runout at the upstream portion of strand 51 (e.g., the portion thereof from the orifice of die 13 to where it comes in contact with guide roller 27A). The diameters of respective guide rollers 27 might be not greater than 20 cm, or they might be not greater than 15 cm, for example. The diameters of respective guide rollers 27 might be mutually identical or they might be different.

The length of strand 51 that is immersed in water within tank 21 (hereinafter "water immersion length") might, for example, be 0.1 m to 5 m. Here, water immersion length is the length of strand 51 itself between the point at which strand 51 enters the water to the point at which strand 51 emerges therefrom so as to be above the water.

2.2.2. Operation in which Water-Cooled Strand is Cooled in Air (Air-Cooling Operation)

At the air-cooling operation, the water-cooled strand 51 is cooled in air. At the air-cooling operation, at least a portion of the moisture adhering to strand 51 might be vaporized by heat possessed by strand 51. As a result, it is possible to suppress absorption of water following pelletizing. To volatilize the moisture adhering to strand 51, it is preferred that air be made to flow over strand 51. Where a blower is used, causing the wind pressure delivered by the blower to be not less than 0.1 MPa and causing the airflow produced thereby to be not less than 5 m$^3$/min will make it possible to effectively volatilize the moisture adhering to strand 51.

With regard to the strand 51 after it has been cooled in water, whereas this is made to experience curvature at guide roller 31A, if the curvature is too sudden, this will tend to cause occurrence of runout at strand 51. The reason for this is that because solidification will have progressed due to its having been cooled in water, strand 51 will not be very flexible.

To suppress occurrence of runout at strand 51, it is preferred that the angle $\delta_3$ made by the portions of strand 51 that are ahead of and behind guide roller 31A be not less than 140°, more preferred that this be not less than 150°, still more preferred that this be not less than 160°, and still more preferred that this be not less than 170°. When this is not less than 140°, because it will be possible to ensure that curvature of strand 51 is gentle, it will be possible to suppress occurrence of runout at strand 51. It is preferred that angle $\delta_3$ be not greater than 179°, and more preferred that this be not greater than 178°. More specifically, of the angles made by the portions of strand 51 that are ahead of and behind guide roller 31A, angle $\delta_3$ is the magnitude of the angle which opens toward the ground as viewed from the side of strand 51.

It is preferred that angle $\delta_3$ be greater than angle $\delta_{2A}$. This will make it possible to reduce occurrence of runout at strand 51. Description will be given with respect to this. When strand 51 experiences curvature at guide roller 31A, because solidification of strand 51 will have progressed further than was the case when it experienced curvature at guide roller 27A, it will have little flexibility. Because strand 51 has little flexibility, if the curvature at guide roller 31A is excessively tight, it may be the case that strand 51 will be unable to conform to that curvature. If strand 51 is unable to conform to that curvature, strand 51 will exhibit runout. Here, if angle $\delta_3$ is greater than angle $\delta_{2A}$, as compared with the opposite situation (i.e., the situation in which angle $\delta_3$ is less than angle $\delta_{2A}$), strand 51 will be more easily able to conform to the curvature at guide roller 31A. Accordingly, ability to reduce runout at strand 51 will be greater if angle $\delta_3$ is greater than angle $\delta_{2A}$ than would be the case in the opposite situation.

It is preferred that the diameter of guide roller 31A be not less than 1 cm, and more preferred that this be not less than 2 cm. The diameter of guide roller 31A might be not greater than 20 cm, or it might be not greater than 15 cm, for example.

It is preferred that the diameters of respective guide rollers 31 be not less than 1 cm, and more preferred that these be not less than 2 cm. The diameters of respective guide rollers 31 might be not greater than 20 cm, or they might be not greater than 15 cm, for example. The diameters of respective guide rollers 31 might be mutually identical or they might be different.

While the length of the interval within which strand 51 is subjected to air-cooling may be chosen as appropriate, it is preferred that this be chosen so as to cause the temperature of strand 51 to be lowered enough to allow it to be cut at pelletizer 41.

2.3. Operation in which Air-Cooled Strand is Cut to Obtain Pellets (Pelletizing Operation)

At the pelletizing operation, the air-cooled strand 51 is cut at pelletizer 41 to obtain pellets.

The pellets are normally cylindrical; more specifically, in the shape(s) of right circular cylinder(s). The shape of the pellet cross-section (hereinafter "cross-sectional shape") is normally elliptical. The reason for this is that the fact that pressure from guide roller(s) 27 acts on strand 51 causes the cross-sectional shape of strand 51 to be elliptical. Note, however, that the cross-sectional shape of the pellet is not limited to the foregoing. For example, it may be circular in shape. Note that the pellet cross-section refers to the cut surface formed by pelletizer 41.

Pellet diameter $D_p$ is less than orifice diameter $D_n$. The reason for this is that because the fact that strand 51 is taken up by the takeup roll causes tension to act on strand 51, strand 51 experiences elongation at the molten portion thereof (i.e., strand 51 experiences elongation at least at the portion thereof from die 13 to water surface 25). Note that pellet diameter $D_p$ is determined by using calipers to measure the maximum diameter of the pellet cross-section (the cut surface formed by pelletizer 41) and the minimum diameter of the pellet cross-section, and dividing the sum of the maximum diameter and the minimum diameter by two. Pellet diameter $D_p$ is the average value of 100 pellets.

It is preferred that pellet diameter $D_p$ be not less than 0.5 mm, more preferred that this be not less than 1.0 mm, still more preferred that this be not less than 1.5 mm, and still more preferred that this be not less than 2.0 mm. It is preferred that pellet diameter $D_p$ be not greater than 4.5 mm, more preferred that this be not greater than 4.0 mm, and still more preferred that this be not greater than 3.5 mm.

It is preferred that the aspect ratio of the pellets be not greater than 2.0, and more preferred that this be not greater than 1.9. Whereas there is a tendency for pellet specific surface area to decrease with decreasing pellet aspect ratio, because causing pellet aspect ratio to be not greater than 2.0 will act to limit the magnitude of the pellet specific surface area, this will make it possible to reduce absorption of water by pellets (e.g., absorption of water by pellets prior to packaging of pellets). The pellet aspect ratio might be not less than 1.2, or it might be not less than 1.3, or it might be not less than 1.4, for example. Note that pellet aspect ratio is the value obtained by dividing the maximum diameter of the pellet cross-section by the minimum diameter of the pellet cross-section. Pellet aspect ratio is the average value of 100 pellets.

The lower the standard deviation of the aspect ratio the smaller will be the runout at strand 51. The reason for this is that whereas the pressure which acts on strand 51 as a result of its coming in contact with guide roller(s) 27 varies in accompaniment to runout of strand 51, the aspect ratio will be proportional to that pressure.

It is therefore the case that the lower the standard deviation of the aspect ratio the more preferred this will be. It is preferred that the standard deviation thereof be not greater than 0.20, more preferred that this be not greater than 0.15, still more preferred that this be not greater than 0.10, and still more preferred that this be not greater than 0.08.

It is preferred that pellet length, more specifically length in the axial direction of the pellet, be not less than 1 mm, more preferred that this be not less than 1.5 mm, still more preferred that this be not less than 2 mm, and still more preferred that this be not less than 2.5 mm. It is preferred that pellet length be not greater than 15 mm, more preferred that this be not greater than 10 mm, still more preferred that this be not greater than 6 mm, still more preferred that this be not greater than 5 mm, and still more preferred that this be not greater than 4 mm.

2.4. Other Operations

Where necessary, the pellets may be allowed to stand while dry air is directed at the pellets. By allowing the pellets to stand, it will be possible to cause at least a portion of the moisture adhering to the pellets to be vaporized by the heat possessed by the pellets. The pellets may be sorted as necessary, and may be packaged as necessary.

2.5. Ratio ($D_p/D_n$) of Pellet Diameter $D_p$ to Orifice Diameter $D_n$

The greater the tension that acts on the molten portion or strand 51 the smaller will be the ratio ($D_p/D_n$) of the pellet diameter $D_p$ to the orifice diameter $D_n$. The ratio ($D_p/D_n$) may therefore be used as an indicator of the tension that acts on the molten portion of strand 51. Note that the ratio ($D_p/D_n$) may be adjusted in correspondence to the speed with which strand 51 is taken up (takeup speed) and/or the extruded amount of strand 51.

Because it will be possible by causing the ratio ($D_p/D_n$) to be not less than 0.65 to prevent excessive tension from acting on the molten portion of strand 51, this will make it possible to suppress occurrence of strand breakage. It is preferred that the ratio ($D_p/D_n$) be not less than 0.67.

By causing the ratio ($D_p/D_n$) to be not greater than 0.97, it will be possible to cause such tension as will suppress occurrence of runout at the molten portion of strand 51 to act on the molten portion of strand 51. It is preferred that the ratio ($D_p/D_n$) be not greater than 0.95, and more preferred that this be not greater than 0.93.

2.6. Speed with which Strand is Taken Up (Hereinafter "Takeup Speed")

It is preferred that that the takeup speed be not less than 20 cm/second, more preferred that this be not less than 30 cm/second, and still more preferred that this be not less than 40 cm/second. When this is not less than 20 cm/second, the pellet production volume per unit time will be superior. It is preferred that that the takeup speed be not greater than 150 cm/second, more preferred that this be not greater than 140 cm/second, still more preferred that this be not greater than 120 cm/second, still more preferred that this be not greater than 100 cm/second, and still more preferred that this be not greater than 80 cm/second.

2.7. Physical Properties of Pellet

It is preferred that the average glass surface area (S) per unit fiber as calculated based on the residual glass fiber length in pellets be not less than 1.1 times the critical glass surface area (Sc). When this is not less than 1.1 times same, it will be possible to produce products having superior mechanical properties, e.g., rigidity and impact resistance, from the pellets.

Measurement of the residual glass fiber length in pellets was carried out as follows. Because proper calculation of fiber length is made difficult in materials containing large amounts of glass fiber filler due to the fact that there is much mutual interference of glass fibers and there is a tendency for damage of glass fibers to occur during measurement, to carry out proper measurement of glass fiber length in accordance with the present embodiment pellets obtained following melt kneading were heated under ignition conditions at 650° C. for 2 hours, the ash was removed therefrom without causing damage to the glass fibers, the glass fibers so obtained were immersed in water, and an ultrasonic cleaner was used to disperse the glass fibers. The dispersed glass fibers were removed therefrom and placed on a microscope slide, a digital microscope (a "KH-7700" manufactured by Hirox Co., Ltd.) was used to carry out observation at 80×, and the weight-average fiber length, i.e., residual glass fiber length, thereof was calculated.

Next, the method for calculating critical glass surface area (Sc) will be described. If it is assumed that there is adequate coupling between glass fibers and polyamide resin, when glass fibers are short, i.e., when glass surface area is small, the glass fibers will come free from the resin, meaning that the degree to which the glass fibers manifest as strength during resin breakage is low; on the other hand, when glass fibers are longer than a critical point, i.e., when glass surface area is large, the glass fibers will break, meaning that the degree to which they contribute to manifestation of glass fiber strength is high.

In other words, for adequate mechanical strength to be manifested, it is necessary that $S \cdot \tau/2 > \sigma \cdot S'$ be satisfied. Here:
 S=Average glass surface area [μm$^2$],
 τ=Shear stress at polyamide resin–glass fiber interface [MPa],
 σ=Glass fiber fracture stress [MPa], and
 S'=Glass fiber cross-sectional area [μm$^2$];
and, for glass of circular cross-section:

$$S=\pi D \cdot l,$$

D=Diameter of glass fiber of circular cross-section [μm],
 l=Residual glass fiber length in pellet [μm], and $$S'=\pi(D/2)^2;$$

and, for glass of flattened cross-section:

$$S=2(a+b)\cdot l,$$

a=Long side of flattened cross-section [μm],
 b=Short side of flattened cross-section [μm],
 l=Residual glass fiber length in pellet [μm], and $$S'=a \cdot b;$$

(note that S and S' are each approximations) and:
 τ=50 MPa (from *Recent Advancement of Interfacial Materials Science on Composite Materials* 2001, Abstracts of the 9th Symposium of the Society of Interfacial Material Science, P-9-1-P-9-4 (issued on 25 Apr. 2001), and
 σ=3500 MPa (from Japanese Patent Application Publication Kokai No. 2003-171143).

The average glass surface area critical point is when the relationship S·τ/2=σ·S' holds, the average glass surface area at such time being taken to be the critical glass surface area (Sc) [μm²].

The critical glass surface area (Sc) may therefore be calculated from the following formula, and the average glass surface area (S) may be calculated as described above.

$$Sc=2S'\cdot\sigma/\tau$$

S·τ/2>σ·S' may be achieved by causing glass fiber of special shape (e.g., at least one of glass fiber of special small-diameter circular cross-section or glass fiber of flattened cross-section, described below) to be blended in polyamide resin (A).

2.8. Glass-Fiber-Reinforced Polyamide Resin Composition, and Raw Material(s) for Same The glass-fiber-reinforced polyamide resin composition comprises polyamide resin(s) (A) and glass fiber(s) (B). It is preferred that the glass-fiber-reinforced polyamide resin composition further comprise copper compound(s) (C), coupling agent(s), release agent(s), and stabilizer(s).

As polyamide resin (A), while there is no particular limitation with respect thereto, polytetramethylene adipamide (polyamide 46), polyhexamethylene adipamide (polyamide 66), polyundecamethylene adipamide (polyamide 116), poly-meta-xylylene adipamide (polyamide MXD6), poly-para-xylylene adipamide (polyamide PXD6), polytetramethylene sebacamide (polyamide 410), polyhexamethylene sebacamide (polyamide 610), polydecamethylene adipamide (polyamide 106), polydecamethylene sebacamide (polyamide 1010), polyhexamethylene dodecamide (polyamide 612), polydecamethylene dodecamide (polyamide 1012), polyhexamethylene isophthalamide (polyamide 61), polytetramethylene terephthalamide (polyamide 4T), polypentamethylene terephthalamide (polyamide 5T), poly-2-methylpentamethylene terephthalamide (polyamide M-5T), polyhexamethylene terephthalamide (polyamide 6T), polyhexamethylene hexahydroterephthalamide (polyamide 6T (H)), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polylauryllactam (polyamide 12), poly-11-aminoundecanoic acid (polyamide) 11), copolymers of these structural units, and so forth may be cited as examples.

To simultaneously attain high flexural modulus of elasticity and high impact resistance, it is preferred that polyamide resin (A) employ a mixture in which aliphatic polyamide(s) (a1) and polyamide(s) (a2) having aromatic component(s) are present in a ratio that is a1:a2=5:95 to 95:5 when expressed as percent by mass.

Because it is preferred that polyamide resins for injection molding retain a prescribed degree or more of crystallinity, where the polyamide (a2) having aromatic component(s) is crystalline, a ratio that is a1:a2=5:95 to 75:25 when expressed as percent by mass is more preferred from the standpoints of moldability and heat resistance. It is still more preferred that this be a1:a2=15:85 to 70:30, and even more preferred that this be a1:a2=20:80 to 65:35.

On the other hand, where the polyamide (a2) having aromatic component(s) is amorphous, a ratio that is a1:a2=60:40 to 95:5 when expressed as percent by mass is preferred from the standpoints of moldability and manufacturability. It is more preferred that this be a1:a2=60:40 to 90:10.

As polyamide (a2) having aromatic component(s), polyamide resin such as will permit manifestation of a high modulus of elasticity as well as adjustment in the speed with which solidification takes place for improved mold transfer characteristics during injection molding and/or strand characteristics during production is preferred. As polyamide (a2) comprising aromatic component(s), while polyamide 6T/6I which employs terephthalic acid and isophthalic acid and adipic acid as raw materials, polyamide 6T/66 which employs terephthalic acid and adipic acid and hexamethylenediamine as raw materials, polyamide MXD6 (poly-meta-xylylene adipamide) which employs meta-xylylenediamine and adipic acid as raw materials, and so forth may be cited as examples, based upon consideration of manifestation of rigidity, retention of toughness, manifestation of strength, and miscibility when polyamides (a1) and (a2) are used in combination, polyamide MXD6 is preferred. Where the primary constituent is crystalline polyamide in which xylylenediamine is a component thereof as is the case with MXD6, it is especially desirable to employ (a2) in the form of poly-meta-xylylene adipamide for which relative viscosity of a portion thereof is 1.4 to 1.8. In other words, it is preferred that polyamide (a2) having aromatic component(s) comprise poly-meta-xylylene adipamide for which relative viscosity is 1.4 to 1.8, and poly-meta-xylylene adipamide for which relative viscosity is greater than 1.8. The poly-meta-xylylene adipamide for which relative viscosity is greater than 1.8 might, for example, be such that the relative viscosity thereof is 1.9 to 3.0.

As aliphatic polyamide (a1), polyamide 6, polyamide 66, polyamide 46, and so forth are preferred from the standpoints of moldability, heat resistance, toughness, rigidity, and so forth.

Where the polyamide (a2) having aromatic component(s) is amorphous, it is preferred that that the aliphatic polyamide (a1) comprise polycaproamide for which the concentration of terminal carboxyl groups is 55 meq/kg to 95 meq/kg and for which relative viscosity in 96% sulfuric acid solution is 1.4 to 2.0. This will give the product a good external appearance and will permit improvement in flow characteristics of the resin composition during molding and in manufacturability when a large amount of tiller in the form of glass fiber of flattened cross-section is present while maintaining a certain degree of toughness.

As polyamide resin (A), polyamide 6, polyamide 66, polyamide 46, polyamide MXD6, polyamide 6T/6, polyamide 6T/66, polyamide 6T/6I, and blends of the foregoing are preferred from the standpoints of moldability, heat resistance, toughness, rigidity, and so forth. Of these, it is preferred that polyamide resin (A) comprise polyamide MXD6 and at least one of polyamide 6 or polyamide 66, and it more preferred that it comprise polyamide MXD6 and polyamide 66. This will make it possible to obtain a high flexural modulus of elasticity. On the other hand, it is also preferred that polyamide resin (A) comprise polyamide 6T/6I and at least one of polyamide 6 or polyamide 66, and it more preferred that it comprise polyamide 6T/6I and polyamide 6.

To permit efficient reaction with coupling agent(s) for glass fiber surface treatment, it is preferred that polyamide resin (A) have carboxyl group(s) and/or amino group(s) at end(s) of molecule(s). More specifically, in terms of concentration of terminal carboxyl groups (CEG: meq/kg), at polyamide resin (A) it is preferred that this be 10 meq/kg to 95 meq/kg, and more preferred that this be 55 meq/kg to 90 meq/kg. Note, however, that while the flow characteristics of poly-meta-xylylene adipamide for which relative viscosity in 96% sulfuric acid solution is 1.4 to 1.8 will be satisfactory, because it will be extremely brittle and will have low impact strength, it is preferred when such poly-meta-xylylene adipamide is comprised thereby that the amount of terminal carboxyl groups be not greater than 50 meq/kg so as to prevent coupling with glass fiber.

It is preferred that polyamide resin (A) be present within 100 mass % of the glass-fiber-reinforced polyamide resin composition in an amount that is not less than 20 mass %, preferred that this be not less than 25 mass %, and more preferred that this be not less than 30 mass %. Because this is not less than 20 mass %, it will be possible to obtain pellets having superior moldability. It is preferred that polyamide resin (A) be present within 100 mass % of the glass-fiber-reinforced polyamide resin composition in an amount that is not greater than 50 mass %, more preferred that this be not greater than 49 mass %, and still more preferred that this be not greater than 45 mass %.

As glass fiber (B), while there is no particular limitation with respect thereto, it is preferred that at least one of glass fiber of special small-diameter circular cross-section or glass fiber of flattened cross-section be used. Of these, glass fiber of flattened cross-section is preferred. The reason for this is that glass fiber of flattened cross-section tends not to break during pellet production, and it is such that glass fiber surface area is large. Any one species of glass fiber (B) may be used alone or a plurality thereof may be used in combination.

Glass fiber of flattened cross-section includes that for which a cross-section perpendicular to the fiber length direction is roughly elliptical, that for which this is roughly oval, and that for which this is roughly cocoon-shaped. It is preferred that the degree to which the glass fiber of flattened cross-section is flattened be 1.5 to 8. Here, what is referred to the degree of flattening, in the context of the smallest-area rectangle that circumscribes the cross-section of the glass fiber in a direction perpendicular to the length direction thereof, taking the length of a long side of that rectangle to be the major axis thereof, and taking the length of a short side of that rectangle to be the minor axis thereof, is the ratio major axis/minor axis. When the degree of flattening is less than 1.5, because there will not be much difference in terms of shape from glass fiber of circular cross-section, there will be situations in which there is little improvement in the impact resistance of the molded product. On the other hand, when the degree of flattening is greater than 8, because the bulk density of the polyamide resin will be high, there will be situations in which it will not be possible to achieve uniform dispersion throughout the polyamide resin, and there will be situations in which there is little improvement in the impact resistance of the molded product. In accordance with the present embodiment, glass fiber having a roughly oval cross-section for which the degree of flattening is 2 to 5 is particularly preferred for causing manifestation of good mechanical properties. While there is no particular limitation with respect to the girth of the glass fiber of flattened cross-section, it is preferred that this be such that the minor axis is on the order of 1 μm to 20 μm, and the major axis is on the order of 2 μm to 100 μm. Furthermore, the glass fiber of flattened cross-section might preferably be employed in the form of fiber bundles which are of chopped strand-like shape, having been cut to a fiber length of on the order of 1 mm to 20 mm. Because it will be possible with such glass fibers of flattened cross-section to reduce the number of glass fibers per unit mass within pellets, this will make it possible to reduce mutual interference of glass fibers.

Glass fiber of special small-diameter circular cross-section is glass fiber of circular cross-section for which the diameter is not greater than 7 μm. By using glass fiber of special small-diameter circular cross-section, it will be possible reduce the critical glass fiber surface area. When the diameter of glass fiber of special small-diameter circular cross-section is greater than 7 μm, because the critical glass surface area will be large, there will be a tendency for damage to fibers during melt kneading to make it difficult to cause average residual glass surface area to be not less than 1.1 times the critical glass surface area. It is preferred that the lower limit of the range in values for the diameter of glass fiber of special small-diameter circular cross-section be on the order of 4 μm. The glass fiber of special small-diameter circular cross-section might preferably be employed in the form of fiber bundles which are of chopped strand-like shape, having been cut to a fiber length of on the order of 1 mm to 20 mm.

It is preferred that glass fiber (B) such as glass fiber of flattened cross-section and/or glass fiber of special small-diameter circular cross-section be treated in advance with a coupling agent such as a silane coupling agent. In other words, it is preferred that glass fiber (B) which has been subjected to treatment with a coupling agent be employed.

Glass fiber (B) is present within 100 mass % of the glass-fiber-reinforced polyamide resin composition in an amount that is not less than 50 mass %, not less than 55 mass % being preferred. Because this is not less than 50 mass %, it will have superior mechanical strength. It is preferred that glass fiber (B) be present within 100 mass % of the glass-fiber-reinforced polyamide resin composition in an amount that is not greater than 80 mass %, more preferred that this be not greater than 75 mass %, and still more preferred that this be not greater than 70 mass %. Glass fiber (B) might be present therein in an amount that is not greater than 65 mass %, or might be present therein in an amount that is not greater than 60 mass %.

It is preferred that polyamide resin (A) and glass fiber (B) be present within 100 mass % of the glass-fiber-reinforced polyamide resin composition in a combined amount that is not less than 94 mass %, preferred that this be not less than 96 mass %, and more preferred that this be not less than 98 mass %. The combined amount in which these are present might be 100 mass %, or might be less than 100 mass %, or might be not greater than 99 mass %.

While coupling agent may be made to adhere in advance to glass fiber (B), to increase ability of glass fiber (B) to wet polyamide resin (A), it is preferred that, separate from any coupling agent which may be made to adhere in advance to glass fiber (B), coupling agent be added thereto. It is preferred that coupling agent be added thereto in an amount that is not less than 0.05 part by mass, more preferred that this be not less than 0.1 part by mass, and still more preferred that this be not less than 0.2 part by mass, for every 100 parts by mass of glass fiber (B). It is preferred that coupling agent be added thereto in an amount that is not greater than 1.0 part by mass, and more preferred that this be not greater than 0.5 part by mass, for every 100 parts by mass of glass fiber (B).

As an example of such a coupling agent, i.e., a coupling agent for addition thereto, silane coupling agent may be cited. It is preferred that the silane coupling agent be a silane coupling agent that exhibits reactivity with respect to polyamides. Any one species of coupling agent may be used alone or a plurality thereof may be used in combination.

As copper compound (C), cuprous chloride, cuprous bromide, cuprous iodide, cupric chloride, cupric bromide, cupric iodide, cupric phosphate, cupric pyrophosphate, copper sulfide, copper nitrate, copper acetate or other such copper salts of organic carboxylic acids, and so forth may be employed. Any one species of copper compound (C) may be used alone or a plurality thereof may be used in combination.

It is preferred that copper compound (C) be present in an amount that is not less than 0.01 part by mass, and more preferred that this be not less than 0.02 part by mass, for every 100 parts by mass of the combined amount of polyamide resin (A) and glass fiber (B). When this is not less than 0.01 part by mass, this will make it possible improve the percent retention of flexural modulus at 180° C. for 2000 hours. It is preferred that copper compound (C) be present in an amount that is not greater than 0.5 part by mass, and more preferred that this be not greater than 0.4 part by mass, for every 100 parts by mass of the combined amount of polyamide resin (A) and glass fiber (B). When this is not greater than 0.5 part by mass, this will make it possible to prevent worsening of physical properties due to copper compound (C).

As stabilizer, alkali metal halide compounds may be cited as examples. As alkali metal halide compounds, lithium chloride, lithium bromide, lithium iodide, sodium fluoride, sodium chloride, sodium bromide, sodium iodide, potassium fluoride, potassium chloride, potassium bromide, potassium iodide, and so forth may be cited as examples. Any one species of stabilizer may be used alone or a plurality thereof may be used in combination.

The glass-fiber-reinforced polyamide resin composition may further comprise inorganic filler, weather-resistance-improving agent in the form of carbon black, photostabilizer and/or thermal stabilizer in the form of phenol-type antioxidant and/or phosphorous-type antioxidant, nucleating agent, lubricant, flame retardant, antistatic agent, pigment, dye, and/or the like.

As inorganic filler, needle-like wollastonite, mica, talc, unfired clay, whiskers, carbon fibers, ceramic fibers, silica, alumina, kaolin, quartz, powdered glass (milled fiber), graphite, and/or the like may be comprised thereby. With respect to these inorganic fillers, those which have been subjected to aminosilane treatment and/or other such surface treatment may be used.

To improve the mechanical properties, electrical properties, and/or the like of the molded product, the glass-fiber-reinforced polyamide resin composition may comprise carbon calcium, barium sulfate, and/or other such filler, potassium titanate and/or other such whiskers, carbon black, metal powder, and/or other such electrical-conductivity-improving filler.

With the goal of modifying the impact resistance and/or other such properties of the polyamide resin, the glass-fiber-reinforced polyamide resin composition may comprise olefin-type compound(s). As olefin-type compound(s), those which have been modified as desired may be employed. For example, where modified polyolefin- and/or styrene-type copolymer(s) are employed, these might be α-olefin-type and/or styrene-type (co)polymer(s) at which copolymerization, graft polymerization, and/or the like is used to cause monomers possessing carboxylic acid group(s) and/or carboxylic acid anhydride group(s) to be included within unmodified polymer molecule chain(s).

The glass-fiber-reinforced polyamide resin composition may comprise reinforcing fiber other than glass fiber (B). As such reinforcing fiber, glass flakes, carbon fibers, potassium titanate whiskers, and other such inorganic fibers, organic fibers, and metal fibers may be cited as examples.

3. Various Modifications May Be Made to the Foregoing Embodiment

Various modifications may be made to the pellet production method at the foregoing embodiment. For example, modifications which may be made to the foregoing embodiment might include any one or more variations chosen from among the following.

The foregoing embodiment was described in terms of a constitution in which, at least in the vicinity of the orifices, the nozzles of die 13 extend in such fashion as to be inclined with respect to the horizontal direction such that they are brought nearer to the water surface 25. However, the foregoing embodiment is not limited to this constitution. For example, it is also possible to adopt a constitution in which, at least in the vicinity of the orifices, the nozzles of die 13 extend in such fashion as to not be inclined with respect to the horizontal direction. Note that the nozzle need not extend such that it is not inclined with respect to the horizontal direction from one end to the other in the MD direction.

The foregoing embodiment was described in terms of a constitution in which angle $\delta_{2A}$ is not less than 90° but is less than 180°. However, the foregoing embodiment is not limited to this constitution. For example, angle $\delta_{2A}$ might be less than 90°, or might be not less than 180°.

The foregoing embodiment was described in terms of a constitution in which angle $\delta_{2B}$ is not less than 90° but is less than 180°. However, the foregoing embodiment is not limited to this constitution. For example, angle $\delta_{2B}$ might be less than 90°, or might be not less than 180°.

Figure 2:
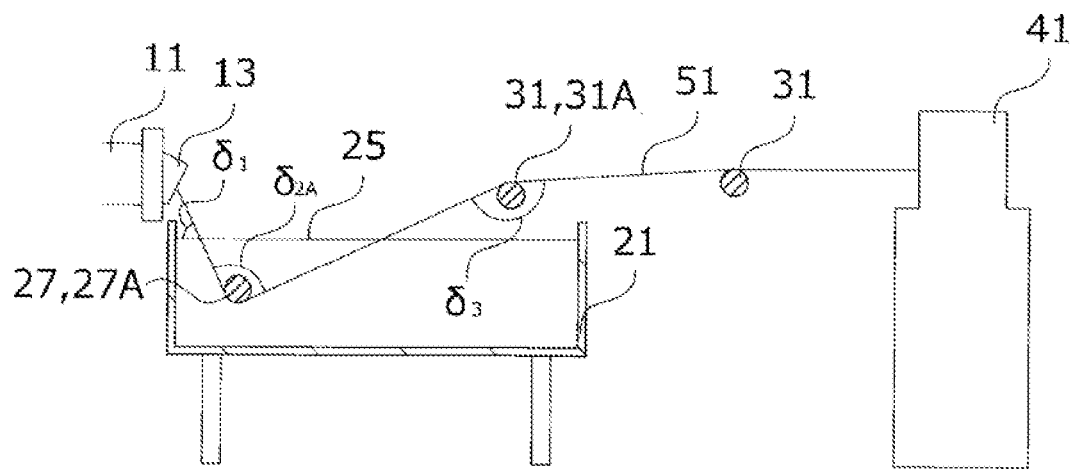
FIG. 2 Schematic diagram showing the constitution of equipment in accordance with a variation on the present embodiment.

The foregoing embodiment was described in terms of a constitution in which a plurality of guide rollers 27 are provided within tank 21. However, the foregoing embodiment is not limited to this constitution. For example, as shown in FIG. 2, it is also possible to adopt a constitution in which a single guide roller 27 (27A) is provided within tank 21. By causing a single guide roller 27 (27A) to be provided therewithin, it will be possible to limit the number of times that strand 51 experiences curvature while underwater. In a constitution in which a single guide roller 27 (27A) is provided within tank 21, it is still more preferred that angle $\delta_{2A}$ be not greater than 120°, still more preferred that this be not greater than 110°, and still more preferred that this be not greater than 100°. When this is not greater than 120°, because it will be possible to cause strand 51 and guide roller 27A to come into reliable mutual contact, it will be possible to reduce the tendency for runout and chaotic motion of strand 51 occurring at locations downstream from guide roller 27A to propagate to locations upstream from guide roller 27A. It will therefore be possible to even more effectively suppress occurrence of strand breakage. And because it will be possible to cause strand 51 and guide roller 27A to come into reliable mutual contact, it will also be possible to cause stresses occurring at strand 51 to be diffused as a result of coming in contact with guide roller 27A.

The foregoing embodiment was described in terms of a constitution in which respective guide rollers 27 are arranged so as to come in contact with the upper portion of strand 51, and more specifically, with that portion thereof which is toward water surface 25 in the radial direction of strand 51. However, the foregoing embodiment is not limited to this constitution.

The foregoing embodiment was described in terms of a constitution in which a plurality of guide rollers 31 are provided downstream from tank 21. However, the foregoing embodiment is not limited to this constitution. For example, a constitution might be adopted in which, downstream from tank 21, only a single guide roller 31 is provided, or a constitution might be adopted in which no guide roller 31 is provided.

The foregoing embodiment was described in terms of a constitution in which respective guide rollers 31 are arranged so as to come in contact with the lower portion of strand 51, and more specifically, with that portion thereof which is toward the ground in the radial direction of strand 51. However, the foregoing embodiment is not limited to this constitution.

The foregoing embodiment was described in terms of a constitution in which angle $\delta_3$ is not less than 140°. However, the foregoing embodiment is not limited to this constitution.

The foregoing embodiment was described in terms of a constitution in which angle $\delta_3$ is greater than angle $\delta_{2A}$. However, the foregoing embodiment is not limited to this constitution.

The foregoing embodiment was described in terms of a constitution in which the air-cooled strand 51 is cut to obtain pellets. However, the foregoing embodiment is not limited to this constitution. For example, the air-cooled strand 51 might be subjected to further water-cooling.

WORKING EXAMPLES

Although working examples are used below to describe the present invention in more specific terms, it should be understood that the present invention, inasmuch as it does not go beyond the gist thereof, is not to be limited by the following working examples.

Relative Viscosity of Polyamide Resin 0.25 g of polyamide resin was dissolved in 25 ml of 96% sulfuric acid to prepare a sample solution. 10 ml of the sample solution was placed in an Ostwald viscosity tube, and the time it took for the sample solution to fall was measured at 20° C. The time it took for the solvent, i.e., sulfuric acid, to fall was also measured at 20° C. Following measurement thereof, relative viscosity (RV) was calculated in accordance with the following formula.

$$RV = T/T_0$$

RV is relative viscosity. T is the time it took for the sample solution to fall. $T_0$ is the time it took for the solvent to fall.

Concentration of Terminal Carboxyl Groups (CEG) in Polyamide Resin 10 ml of benzyl alcohol was added to 0.2 g of polyamide resin, and this was allowed to dissolve for 5 minutes at 180° C.±5° C. This solution was cooled for 15 seconds in water, this was titrated with ethanolic potassium hydroxide solution (80 ml of 0.5 N KOH to which ethanol was added to adjust volume to 1000 ml) using phenolphthalein as indicator, and CEG (in units of meq/kg) was calculated in accordance with the following formula.

$$CEG = \{[(A-B) \times N \times f]/(W \times 1000)\} \times 10^6$$

A is the amount of titrant as expressed in ml. B is the amount of solvent blank titrant as expressed in ml. N is the concentration of ethanolic potassium hydroxide as expressed in mol/l. f is the conversion factor for ethanolic potassium hydroxide. W is the mass of polyamide resin as expressed in g.

Flexural Strength and Flexural Modulus of Elasticity

Flexural strength and flexural modulus of elasticity of test pieces for three-point flexural testing prepared from pellets were measured in accordance with ISO-178. More specifically, the test pieces for three-point flexural testing were placed on two support stages, and an indenter was used to apply a force at a central location between the supports to cause bending. Testing was carried out at the following conditions.

| | |
|---|---|
| Test pieces for three-point flexural testing | Length 100 mm, width 10 mm, thickness 4 mm |
| Distance between supports | 64 mm |
| Test speed | 2 mm/min |

Percent Retention of Flexural Strength (Resistance to Thermal Aging)

To determine percent retention of flexural strength, test pieces for three-point flexural testing were placed in an oven at 180° C. and heated for 2000 hours at 180° C., and the flexural strength following heating was measured. The percent retention of flexural strength was calculated in accordance with the following formula.

Percent Retention of Flexural Strength=(flexural strength after heating/flexural strength before heating)×100

Charpy Impact Testing

Charpy impact strength of test pieces for impact testing prepared from pellets was measured at 23° C. in accordance with ISO 179-1. Shape of these test pieces was 1 eA (machined notch).

Residual Glass Fiber Length

Pellets were heated under ignition conditions at 650° C. for 2 hours, the ash was removed therefrom without causing damage to the glass fibers, the glass fibers so obtained were immersed in water, and an ultrasonic cleaner was used to disperse the glass fibers. The dispersed glass fibers were removed therefrom and placed on a microscope slide, a digital microscope (a "KH-7700" manufactured by Hirox Co., Ltd.) was used to carry out observation at 80×, and the weight-average fiber length, i.e., residual glass fiber length, thereof was calculated.

Average Glass Surface Area (S) and Critical Glass Surface Area (Sc)

Average glass surface area (S) and critical glass surface area (Sc) were determined in accordance with the foregoing method. Note that 50 MPa was used for τ. 3500 MPa was used for σ.

Angle $\delta_1$ of Incidence with Respect to Water, Angle $\delta_{2A}$, and Angle $\delta_3$ Polyester film ("E5000" manufactured by Toyobo Co., Ltd.; thickness 100 μm) 20 cm in width was suspended without sagging from the die orifices to the entrance of the pelletizer in parallel fashion with respect to the strand path. An angle protractor ("AP-130" manufactured by Niigata Seiki Co., Ltd.) was used to measure the magnitude of the acute angle formed where the polyester film suspended in this fashion first intersected the water surface, i.e., the angle $\delta_1$ of incidence with respect thereto. Moreover, the angle $\delta_{2A}$, and the angle $\delta_3$ formed by the polyester film were also measured using the angle protractor.

Pellet Diameter $D_p$

Pellet diameter $D_p$ was determined by using calipers to measure the maximum diameter of the pellet cross-section (the cut surface formed by the pelletizer) and the minimum diameter of the pellet cross-section, and dividing the sum of the maximum diameter and the minimum diameter by two. The pellet diameter $D_p$ shown in TABLE 2 is the average value of 100 pellets.

Aspect Ratio and Standard Deviation Thereof

Pellet aspect ratio is the value obtained by dividing the maximum diameter of the pellet cross-section by the minimum diameter of the pellet cross-section. The pellet aspect ratio shown in TABLE 2 is the average value of 100 pellets. The standard deviation of the aspect ratio is also shown in TABLE 2.

Polyamide Resin (A) Used a1A Polyamide 6 of relative viscosity=1.9; "Nylon T-860" manufactured by Toyobo Co., Ltd.; CEG=80 meq/kg a1B Polyamide 66 of relative viscosity=2.4; "Stabamide 23AE" manufactured by Rhodia; CEG=91 meq/kg a2A Polyamide MXD6 of relative viscosity=2.1; "Nylon T600" manufactured by Toyobo Co., Ltd.; CEG=65 meq/kg; crystalline polyamide a2B Polyamide MXD6 of relative viscosity=1.7; "Nylon T640" manufactured by Toyobo Co., Ltd.; CEG=35 meq/kg; crystalline polyamide a2C Polyamide 6T6I of relative viscosity=2.0; "Grivory-G21" manufactured by EMS; CEG=87 meq/kg; amorphous polyamide Glass Fiber (B) Used b1 "CSG3PA820S" manufactured by Nitto Boseki Co., Ltd. as chopped-strand glass fiber of flattened cross-section; degree of flattening=4; minor axis=7 µm; fiber length=3 mm b2 "3DE-452" manufactured by Nitto Boseki Co., Ltd. as chopped-strand glass fiber of circular cross-section; diameter=6.5 µm; fiber length=3.3 mm Copper Compound (C) Used C Copper(II) bromide Other Components (D) Used Release agent "WE40" montanic acid ester wax manufactured by Clariant Stabilizer Potassium iodide Coupling agent "KBE-903" manufactured by Shin-Etsu Chemical Co., Ltd. (aminosilane coupling agent)

Preparation of Pellets at Working Examples 1, 2, and 4, and Comparative Example 1

Raw materials were measured out in accordance with the blended ratios shown at TABLE 1, all components except glass fiber (B) were mixed in a tumbler, these were thereafter fed into the main supply port of a twin-screw extruder for which the screw L/D was 34 ("TEM48BS" manufactured by Toshiba Machine Co., Ltd.) and melt kneaded at a screw rotational speed of 280 rpm and a cylinder temperature of 260° C., glass fiber (B) was then fed thereinto using the side feed method and melt kneading was carried out, and strands were expelled therefrom by way of a die having 10 orifices at which the diameter $D_n$ was 4.0 mm. Note that the die used was a strand die having nozzles at which the nozzle expulsion direction was inclined 70° with respect to the horizontal direction so as to be brought nearer to the water surface.

The strands that exited the die were drawn into a tank containing water at a temperature of 30° C., the water-cooled strands were cooled in air, and the cooled strands were cut into pellets at a pelletizer to produce pellets. Note that the procedure up to this point was carried out using equipment constituted as shown in FIG. 2. Pellet production was carried out for 24 hr. Pellet yield and the number of times that strand breakage occurred during pellet production are shown in TABLE 2. Note that the diameters of the respective guide rollers employed at the water-cooling operation and the air-cooling operation were 4.8 cm.

Pellets were dried for 12 hours at 100° C., following which an injection molding machine ("IS80" manufactured by Toshiba Machine Co., Ltd.) was used to carry out injection molding at a cylinder temperature of 260° C. and a mold temperature of 80° C. to prepare test pieces of the respective types (test pieces for three-point flexural testing and test pieces for impact testing).

Preparation of Pellets at Working Example 5 and Comparative Example 2

Raw materials were measured out in accordance with the blended ratios shown at TABLE 1, all components except glass fiber (B) were mixed in a tumbler, these were thereafter fed into the main supply port of a twin-screw extruder for which the screw L/D was 34 ("TEM48BS" manufactured by Toshiba Machine Co., Ltd.) and melt kneaded at a screw rotational speed of 280 rpm and a cylinder temperature of 280° C., glass fiber (B) was then fed thereinto using the side feed method and melt kneading was carried out, and strands were expelled therefrom by way of a die having 10 orifices at which the diameter $D_n$ was 4.0 mm. Note that the die used was a strand die having nozzles at which the nozzle expulsion direction was inclined 70° with respect to the horizontal direction so as to be brought nearer to the water surface.

The strands that exited the die were drawn into a tank containing water at a temperature of 30° C., the water-cooled strands were cooled in air, and the cooled strands were cut into pellets at a pelletizer to produce pellets. Note that the procedure up to this point was carried out using equipment constituted as shown in FIG. 2. Pellet production was carried out for 24 hr. Pellet yield and the number of times that strand breakage occurred during pellet production are shown in TABLE 2. Note that pellet production was aborted in the event that the number of times that strand breakage occurred reached 20. Furthermore, the diameters of the respective guide rollers employed at the water-cooling operation and the air-cooling operation were 4.8 cm.

Pellets were dried for 12 hours at 100° C., following which an injection molding machine ("IS80" manufactured by Toshiba Machine Co., Ltd.) was used to carry out injection molding at a cylinder temperature of 285° C. and a mold temperature of 140° C. to prepare test pieces of the respective types (test pieces for three-point flexural testing and test pieces for impact testing).

Preparation of Pellets at Working Example 3 and Comparative Example 3

Raw materials were measured out in accordance with the blended ratios shown at TABLE 1, all components except glass fiber (B) were mixed in a tumbler, these were thereafter fed into the main supply port of a twin-screw extruder for which the screw L/D was 34 ("TEM48BS" manufactured by Toshiba Machine Co., Ltd.) and melt kneaded at a screw rotational speed of 280 rpm and a cylinder temperature of 280° C., glass fiber (B) was then fed thereinto using the side feed method and melt kneading was carried out, and strands were expelled therefrom by way of a die having 10 orifices at which the diameter $D_n$ was 2.7 mm. Note that the die used was a strand die having nozzles at which the nozzle expulsion direction was inclined 70° with respect to the horizontal direction so as to be brought nearer to the water surface.

The strands that exited the die were drawn into a tank containing water at a temperature of 30° C., the water-cooled strands were cooled in air, and the cooled strands were cut into pellets at a pelletizer to produce pellets. Note that the procedure up to this point was carried out using equipment constituted as shown in FIG. 2. Pellet production was carried out for 24 hr. Pellet yield and the number of times that strand breakage occurred during pellet production are shown in TABLE 2. Note that pellet production was aborted in the event that the number of times that strand breakage occurred reached 20. Furthermore, the diameters of the respective guide rollers employed at the water-cooling operation and the air-cooling operation were 4.8 cm.

Pellets were dried for 12 hours at 100° C., following which an injection molding machine ("IS80" manufactured by Toshiba Machine Co., Ltd.) was used to carry out injection molding at a cylinder temperature of 285° C. and a mold temperature of 140° C. to prepare test pieces of the respective types (test pieces for three-point flexural testing and test pieces for impact testing).

Moreover, yield at Comparative Example 1 was lower than was the case at Working Examples 1-5. The reason for this is that because the number of times that strand breakage occurred was high, much of the glass-fiber-reinforced polyamide resin composition was lost.

It should incidentally be noted that the standard deviation of the aspect ratio was low at the respective Working Examples.

INDUSTRIAL UTILITY

Because a pellet production method in accordance with the present embodiment will make it possible to reduce the frequency of occurrence of strand breakage, it has industrial utility.

TABLE 1

|     |     |     |     | Blend 1 | Blend 2 | Blend 4 | Blend 7 |
| --- | --- | --- | --- | --- | --- | --- | --- |
| (A) | a1A | Polyamide 6; RV = 1.9 | Parts by mass | 35 | 27 | 40 | |
|     | a1B | Polyamide 66; RV = 2.4 | Parts by mass | | | | 9 |
|     | a2A | Polyamide MXD6; RV = 2.1 | Parts by mass | | | | 17 |
|     | a2B | Polyamide MXD6; RV = 1.7 | Parts by mass | | | | 9 |
|     | a2C | Polyamide 6T61; RV = 2.0 | Parts by mass | 5 | 3 | 10 | |
| (B) | b1 | Glass fiber of flattened cross-section | Parts by mass | 60 | 70 | 50 | |
|     | b2 | Glass fiber of circular cross-section; 6.5 μm | Parts by mass | | | | 65 |
| (C) | | Copper compound | Parts by mass | 0.2 | 0.2 | 0.2 | 0.2 |
| (D) | | Release agent | Parts by mass | 0.3 | 0.3 | 0.3 | 0.3 |
|     | | Stabilizer | Parts by mass | 0.3 | 0.3 | 0.3 | 0.3 |
|     | | Coupling agent | Parts by mass | 0.2 | 0.2 | 0.2 | 0.2 |
| Flexural strength | | | MPa | 417 | 502 | 336 | 470 |
| Flexural modulus of elasticity | | | GPa | 20.5 | 27.1 | 14.5 | 22.5 |
| Charpy impact strength (23° C.) | | | kJ/m$^2$ | 31.7 | 46.7 | 25.7 | 24.1 |
| Residual glass fiber length | | | μm | 582 | 575 | 589 | 265 |
| Average glass surface area (S) | | | μm$^2$ | 40740 | 40250 | 41230 | 5411 |
| Critical glass surface area (Sc) | | | μm$^2$ | 27440 | 27440 | 27440 | 4646 |
| Average glass surface area/critical glass surface area | | | — | 1.48 | 1.47 | 1.50 | 1.16 |
| Percent retention of flexural strength after 180° C. × 2000 Hr | | | % | 75 | 74 | 77 | 75 |

TABLE 2

| | Blend | $\delta_1$ (°) | $\delta_{2A}$ (°) | $\delta_3$ (°) | Extruded Amount (kg/hr) | Takeup Speed (cm/sec) | Pellet Diameter $D_p$ (mm) | Aspect Ratio | Standard Deviation of Aspect Ratio | Orifice Diameter $D_n$ (mm) | Ratio of Diameter $D_p$ to Diameter $D_n$ ($D_p/D_n$) | Strand Breakage Frequency (Number of Times Breakage Occurred) | Yield (%) | Machine Stage Aborted |
| --- | --- | --- | --- | --- | --- | --- | --- | --- | --- | --- | --- | --- | --- | --- |
| Working Example 1 | 1 | 76 | 97 | 173 | 240 | 69 | 2.7 | 1.7 | 0.05 | 4.0 | 0.67 | 4 | 96 | — |
| Working Example 2 | 1 | 87 | 90 | 177 | 240 | 69 | 2.7 | 1.6 | 0.04 | 4.0 | 0.67 | 2 | 97 | — |
| Working Example 3 | 2 | 85 | 90 | 175 | 170 | 52 | 2.5 | 1.9 | 0.07 | 2.7 | 0.93 | 6 | 93 | — |
| Working Example 4 | 4 | 72 | 99 | 171 | 220 | 59 | 2.9 | 1.5 | 0.04 | 4.0 | 0.73 | 2 | 97 | — |
| Working Example 5 | 7 | 79 | 94 | 173 | 250 | 60 | 2.9 | 1.6 | 0.04 | 4.0 | 0.72 | 3 | 97 | — |
| Comparative Example 1 | 1 | 65 | 103 | 168 | 240 | 69 | 2.7 | 1.7 | 0.22 | 4.0 | 0.67 | 17 | 80 | — |
| Comparative Example 2 | 1 | 76 | 97 | 173 | 135 | 49 | 2.4 | 2.5 | 0.24 | 4.0 | 0.60 | >20 | — | 3 hr |
| Comparative Example 3 | 2 | 85 | 90 | 175 | 165 | 47 | 2.6 | 1.9 | 0.23 | 2.7 | 0.98 | >20 | — | 11 hr |

Suppression of strand breakage was able to be achieved at the respective Working Examples. On the other hand, the frequency of occurrence of strand breakage at the respective Comparative Examples was high. For example, the number of times that strand breakage occurred reached 20 after 3 hr of pellet production at Comparative Example 2, and the number of times that strand breakage occurred reached 20 after 11 hr of pellet production at Comparative Example 3.

EXPLANATION OF REFERENCE NUMERALS

11 . . . extruder; 13 . . . die; 21 . . . tank; 25 . . . water surface; 27 . . . guide roller (in particular, the upstreammost guide roller 27 is guide roller 27A, and the guide roller 27 which is downstream from guide roller 27A is guide roller 27B); 31 . . . guide roller (in particular, the upstreammost guide roller 31 is guide roller 31A);

41 ... pelletizer; 51 ... strand; $\delta_1$ ... angle of incidence with respect to water; $\delta_{2A}$ ... angle (more specifically, the angle made by the portions of strand 51 that are ahead of and behind guide roller 27A); $\delta_{2B}$ ... angle (more specifically, the angle made by the portions of strand 51 that are ahead of and behind guide roller 27B); $\delta_3$ ... angle (more specifically, the angle made by the portions of strand 51 that are ahead of and behind guide roller 31A)

The invention claimed is:

1. A pellet production method comprising:
   an operation in which a strand comprising a glass-fiber-reinforced polyamide resin composition containing 50 mass % to 80 mass % of glass fiber is extruded from an orifice at a die;
   an operation in which the strand is drawn into water within a tank and is cooled; and
   an operation in which the cooled strand is cut to obtain a pellet;
   wherein an angle of incidence at which the strand enters the water within the tank is not less than 70° but is less than 90°; and
   wherein a ratio of a diameter of the pellet to a diameter of the orifice (diameter of the pellet/diameter of the orifice) is 0.65 to 0.97.

2. The pellet production method according to claim 1 wherein
   at least one first guide roller for guiding the strand within the tank is provided within the tank; and
   an angle made by portions of the strand that are ahead of and behind that first guide roller which is in an upstreammost location is not less than 90°.

3. The pellet production method according to claim 2 wherein the angle made by the portions of the strand that are ahead of and behind that first guide roller which is in the upstreammost location is not greater than 179°.

4. The pellet production method according to claim 2 wherein there is only one of the at least one first guide roller provided within the tank.

5. The pellet production method according to claim 2 wherein the angle made by the portions of the strand that are ahead of and behind that first guide roller which is in the upstreammost location is not greater than 120°.

6. The pellet production method according to claim 1 wherein the operation in which the strand is cooled comprises an operation in which the strand that was water-cooled within the tank is air-cooled.

7. The pellet production method according to claim 6 wherein
   at least one second guide roller for causing the strand that was water-cooled within the tank to be guided through air is provided; and
   an angle made by portions of the strand that are ahead of and behind that second guide roller which is in an upstreammost location is not less than 140°.

8. The pellet production method according to claim 1 wherein
   the operation in which the strand is cooled comprises an operation in which the strand that was water-cooled within the tank is air-cooled;
   at least one first guide roller for guiding the strand within the tank is provided within the tank;
   at least one second guide roller for causing the strand that was water-cooled within the tank to be guided through air is provided; and
   an angle made by portions of the strand that are ahead of and behind that second guide roller which is in an upstreammost location is greater than an angle made by portions of the strand that are ahead of and behind that first guide roller which is in an upstreammost location.

9. The pellet production method according to claim 1 wherein a standard deviation of an aspect ratio of the pellet is not greater than 0.20.

10. The pellet production method according to claim 1 wherein polyamide resin is present within 100 mass % of the glass-fiber-reinforced polyamide resin composition in an amount that is not less than 20 mass %.

11. The pellet production method according to claim 1 wherein average glass surface area per unit fiber as calculated based on residual glass fiber length at the pellet is not less than 1.1 times critical glass surface area.

12. The pellet production method according to claim 1 wherein polyamide resin comprised by the glass-fiber-reinforced polyamide resin composition comprises an aliphatic polyamide and a polyamide having an aromatic component.

13. The pellet production method according to claim 12 wherein the polyamide having the aromatic component comprises poly-meta-xylene adipamide for which concentration of terminal carboxy groups is not greater than 50 meq/kg and for which relative viscosity in 96% sulfuric acid solution is 1.4 to 1.8.

14. The pellet production method according to claim 12 wherein the aliphatic polyamide comprises polycaproamide for which concentration of terminal carboxy groups is 55 meq/kg to 95 meq/kg and for which relative viscosity in 96% sulfuric acid solution is 1.4 to 2.0.

15. The pellet production method according to claim 1 wherein the glass fiber comprises at least either glass fiber of circular cross-section of diameter not greater than 7 μm or glass fiber of flattened cross-section.

16. The pellet production method according to claim 1 wherein an extruder is used to extrude the strand.

17. The pellet production method according to claim 1 wherein, at the operation in which the strand is extruded, the strand is extruded in air.

* * * * *